United States Patent
Cuddihy et al.

(10) Patent No.: US 8,165,760 B2
(45) Date of Patent: Apr. 24, 2012

(54) METHOD AND SYSTEM FOR ELECTRONICALLY OPERATING A VEHICLE OCCUPANT SEAT SAFETY RESTRAINT SYSTEM

(75) Inventors: Mark Cuddihy, New Boston, MI (US); Manoharprasad K. Rao, Novi, MI (US); Priya Prasad, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 458 days.

(21) Appl. No.: 12/435,922

(22) Filed: May 5, 2009

(65) Prior Publication Data

US 2010/0286873 A1    Nov. 11, 2010

(51) Int. Cl.
*B60R 21/0134* (2006.01)

(52) U.S. Cl. .......................................... 701/45; 297/468

(58) Field of Classification Search .................... 701/36, 701/45; 297/464, 468, 474, 476, 477
See application file for complete search history.

(56) References Cited

U.S. PATENT DOCUMENTS

| | | | |
|---|---|---|---|
| 3,807,522 A | 4/1974 | Becker | |
| 3,845,836 A | 11/1974 | Bendler et al. | |
| 4,280,584 A | 7/1981 | Makishima | |
| 5,485,970 A | 1/1996 | Steffens, Jr. | |
| 5,568,939 A * | 10/1996 | Blackburn et al. | 280/806 |
| 5,626,359 A * | 5/1997 | Steffens et al. | 280/735 |
| 5,642,916 A * | 7/1997 | Dybro et al. | 297/216.18 |
| 5,743,563 A | 4/1998 | Juchem et al. | |
| 6,497,456 B1 | 12/2002 | Masuda et al. | |
| 6,533,321 B2 * | 3/2003 | Class et al. | 280/806 |
| 6,550,810 B1 | 4/2003 | Bauer et al. | |
| 6,824,222 B2 | 11/2004 | Maloney et al. | |
| 6,848,717 B2 | 2/2005 | Bullinger et al. | |
| 2004/0026981 A1 * | 2/2004 | Maloney et al. | 297/474 |
| 2007/0228705 A1 * | 10/2007 | Rao et al. | 280/735 |
| 2008/0290644 A1 * | 11/2008 | Spahn et al. | 280/806 |
| 2010/0270786 A1 * | 10/2010 | Kump et al. | 280/805 |
| 2011/0215185 A1 * | 9/2011 | Clute et al. | 242/374 |

* cited by examiner

*Primary Examiner* — Thomas Black
*Assistant Examiner* — Sara Lewandroski
(74) *Attorney, Agent, or Firm* — Franklin MacKenzie; Ford Global Technologies, LLC

(57) ABSTRACT

An electrically activated, electronically controlled web grabber in conjunction with a pre-impact braking system that holds the vehicle safety belt from the moment of activation, restricting forward movement of the occupant and can be activated prior to the impact to ensure occupant containment and deactivated upon command in order to release after an accident is avoided, or once the impact has started to allow other safety devices to take over control of the belts, for example, by load limiters.

7 Claims, 4 Drawing Sheets

METHOD AND SYSTEM FOR ELECTRONICALLY OPERATING A VEHICLE OCCUPANT SEAT SAFETY RESTRAINT SYSTEM

TECHNICAL FIELD

Pre-impact braking systems are being introduced in automotive vehicles as a means for improving the vehicle safety. Upon detection of an imminent collision by the vehicle collision warning system, using a combination of RADAR, vision and LIDAR sensors, the vehicle activates the brakes just prior to impact. In some cases, this braking can avoid an accident altogether, and in cases where the vehicle speed is too great to avoid the accident, the application of the brakes prior to impact reduces the kinetic energy of the vehicle and thereby the severity of impact. One design concern of these pre-impact braking systems is that the braking may cause the occupants to move forward relative to the vehicle interior just prior to impact. This could potentially put them in the airbag deployment zone, should the airbag deploy as a result of the impact.

One method of addressing this concern is the addition of motorized belt pretensioners (MBPs) to the restraints systems. These motorized belt pretensioners use an electric motor to quickly wind the seat belt retractor just prior to impact. The slack is removed from the seat belt system so it can better restrict the forward movement of the occupant. Although the motors are not strong enough to prevent forward movement altogether, they can significantly reduce the forward motion of the occupant to the point where the occupant is prevented from moving into the airbag deployment zone. The MBPs also have the ability to be electronically activated by a signal from the Restraints Control Module (RCM), and can be deactivated after the impact is complete, or if there was a near miss that the sensing system initially detected as an imminent collision, but driver interaction or other factors caused the collision to be avoided.

Although the systems described above provide additional protection to the vehicle occupants, there are a number of practical shortcomings. One, the MBPs are relatively large and may be difficult to package in the vehicle. The package constraints limit the size of the motor that can be used, which results in pretensioning levels significantly lower than typical pyrotechnic pretensioners. Thus, the MBPs may not be fully capable of preventing forward movement of the occupant, but may only reduce the occupant's forward movement. The MBPs also use a significant amount of power to pretension and hold the seatbelts, which requires modifications to the vehicle electrical system.

A potential alternative to MBPs for controlling the payout of the belts during braking is web grabbers. These web grabbers actually tighten onto the seatbelt webbing and prevent it from spooling off of the seat belt retractor. They are strong enough to hold an occupant and keep them from moving forward during pre-impact braking. However, these devices are currently mechanically activated by the forces of a collision, and lack the control required to activate them prior to collision and/or deactivate them after a potential collision is avoided.

There is a need for an electrically activated web grabber in conjunction with the pre-impact braking system to reduce forward occupant movement.

There is further a need for an electrically activated, electronically controlled web grabber in conjunction with a pre-impact braking system that holds the vehicle safety belt from the moment of activation, preventing forward movement of the occupant. The web grabber can be activated prior to the impact to ensure occupant containment and deactivated upon command in order to release after an accident is avoided, or once the impact has started to allow other safety devices, for example load limiters, to take over control of the belts.

SUMMARY

In one aspect, one embodiment of the present application relates to a method to operate a vehicle occupant restraint safety system in association with a vehicle seat. One such method may include the steps of:
 determining, by means of a collision warning system, whether a vehicle collision event is imminent;
 activating pre-impact braking;
 activating a seat belt web grabber;
 determining whether an actual vehicle collision event has occurred;
 activating a vehicle occupant restraint safety system; and
 deactivating said seat belt web grabber.

The seat belt web grabbers may be electronically controlled by an electronic control module, such as, a restraint control module. Moreover, the activation of a pre-impact braking system may be determinative of an imminent vehicle collision event.

DETAILED DESCRIPTION

Figure 1:
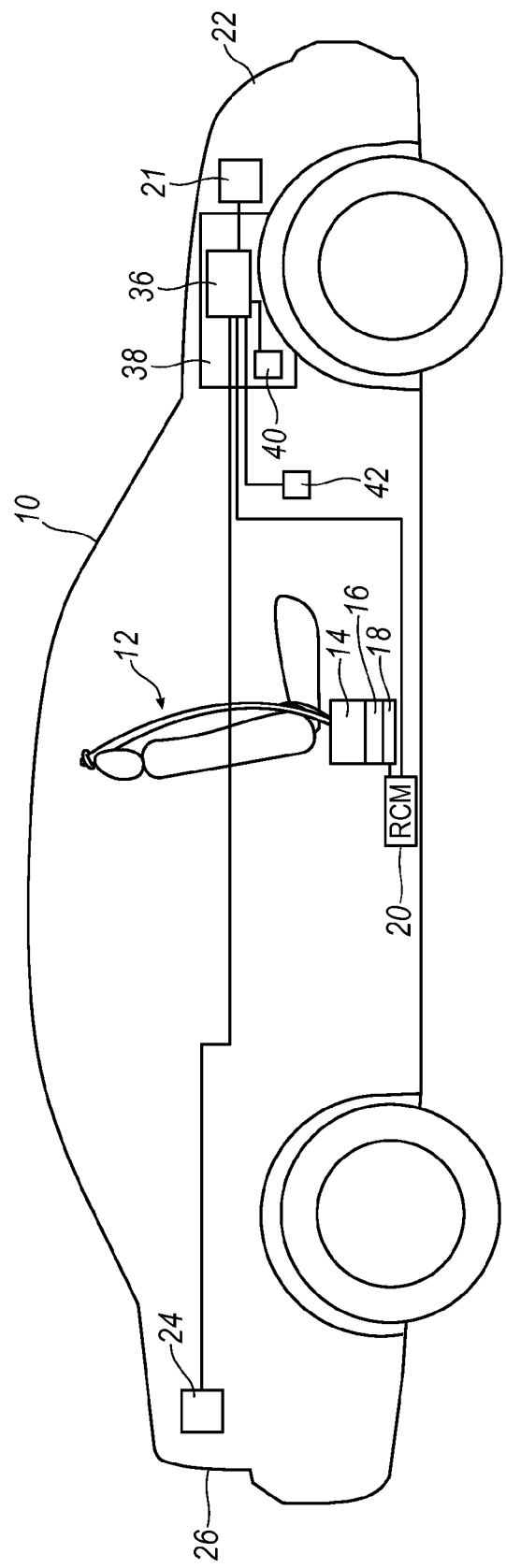
FIG. 1 is a side view of a vehicle showing a collision warning system with an electronically controlled vehicle safety restraint system according to one embodiment of the present application.

Turning now to the drawings wherein like numbers refer to like structures, and particularly to FIG. 1, there is shown therein a vehicle 10 with schematic representations of restraint 12, seat belt retractor 14, a web grabber 16, which is activated by a solenoid 18. The solenoid releases a spring loaded grabber, as is known in the art, to grab the seat belt webbing and secure the seat belt from playing out during a deceleration or crash event. A restraint control module (RCM) 20 may be electrically connected to the solenoid 18. The vehicle is further equipped with sensors 21 in the front 22 of the vehicle, and sensors 24 in the rear 26 of the vehicle. The sensors are Lidar, Radar or Vision sensors and are connected to the collision prediction systems, shown as box 36. The engine 38 may also have an electronic control unit (ECU) 40, which may also be electronically connected to the collision warning system 36. The vehicle is also equipped with a braking system 42 with pre-impact braking capabilities, which is also connected to the collision warning system 36. When a pre-impact event is detected by the collision warning system 36, it sends a message to the restraint control module 20 to activate the solenoid 18 to position the electronic web grabber 16 to lock the seat belt system. The collision warning system also sends a message to the brake system 42 to apply pre-impact braking to slow the vehicle. It is generally understood that many vehicle collision prediction systems may include a pre-braking system that applies the brakes whenever a pre-impact event is sensed. Suitable pre-impact systems may be understood by reference to U.S. Ser. No. 12/145,642, incorporated herein by reference.

The electrically activated web grabber works in conjunction with the collision warning system and the pre-impact braking system to reduce occupant forward movement. The web grabber holds the belt from the moment of activation, preventing seat belt webbing from leaving the retractor, and thus restricting the forward movement of the occupant. It can be activated prior to or simultaneously with pre-impact braking to ensure occupant containment and can be deactivated upon command in order to release after an accident is avoided, or once the impact has started to allow other safety devices, such as, load limiters to take over control of the belts.

Figure 2:
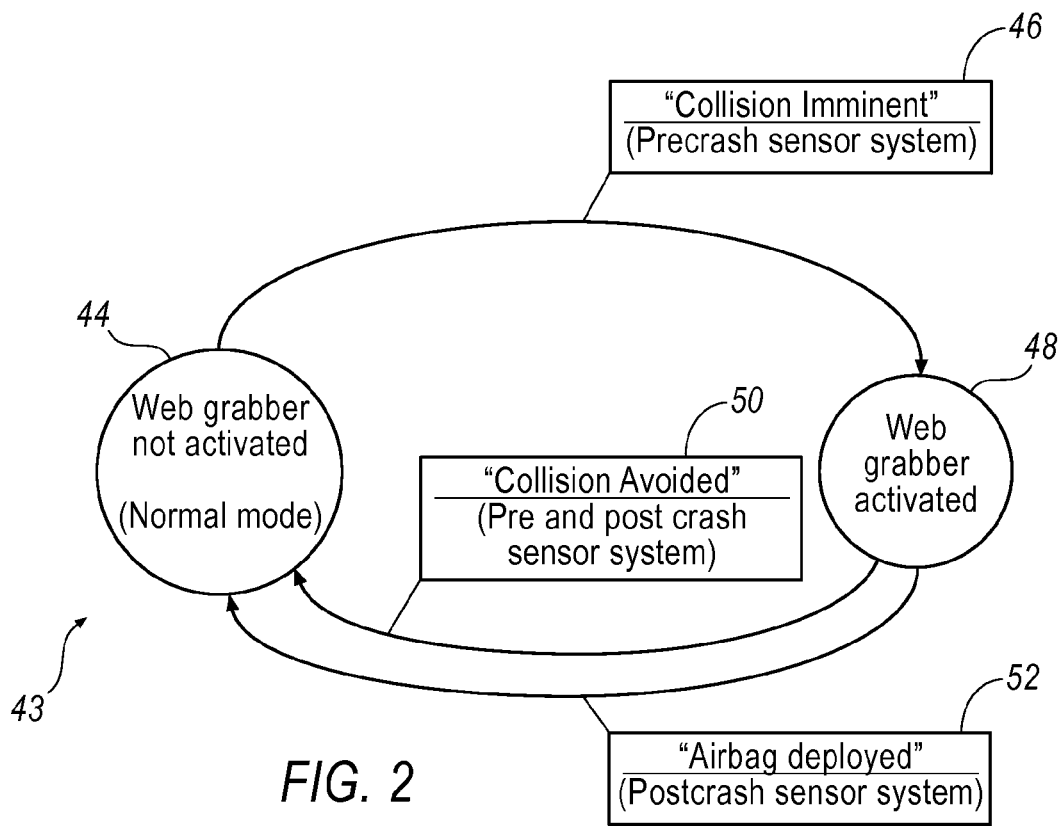
FIG. 2 is a state diagram showing how the web grabbers are controlled by the vehicle restraint system according to one embodiment of the present application.

These electronically activated web grabbers are controlled by the restraints control module according to the state diagram shown in FIG. 2. Basically, in step 44 the web grabber is not activated and the vehicle is traveling in a normal mode. A collision may be sensed as imminent at 46, and the web grabber is activated at 48. Where, as at step 50, a collision is avoided, the web grabber is de-activated and the system assumes a closed loop configuration. The system senses when a collision is avoided by post impact sensor systems. In the event that an air bag is deployed, as at step 52, the post impact sensor system indicates that an airbag is deployed, the web grabbers are then de-activated, and the system assumes a closed loop configuration. As may be appreciated, but not necessarily, the web grabber can be solenoid activated when a signal is received from a controller, preferably the RCM, indicating that a pre-impact event is imminent. When the solenoid is activated, the web grabber is operational and the seat belt is held from movement.

In order to facilitate release of the web grabbers, the clamping mechanism must be spring loaded, or actively opened with a solenoid. The clamping surface must also be designed to facilitate release of the clamping force while under load from the occupant's forward movement. Even with these design requirements, the electrically activated web grabbers are smaller and less complex than motorized belt pretensioners. The solenoid activated web grabbers also can be activated significantly faster than larger, motorized belt pretensioners, due to inertial effects.

Figure 3:
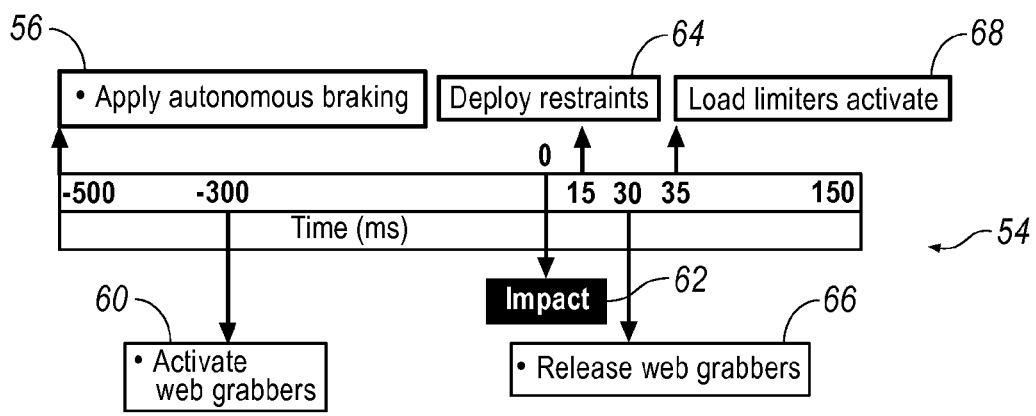
FIG. 3 is a time line showing events that occur during restraint system deployment according to one embodiment of the present application.

In this regard, reference is made to FIG. 3, wherein a pre-impact time line 54 is set forth. Specifically, when a pre-impact event is sensed, autonomous pre-braking 56 occurs at about 500 milliseconds before an imminent crash event. The web grabber 60 is activated at about 300 milliseconds before imminent impact event. When the impact or crash event 62 occurs, the restraints are deployed at step 64 in about 15 milliseconds, the web grabbers are released at step 66 at about 30 milliseconds after impact or crash event, and the load limiters are activated at step 68 at about 35 milliseconds after impact.

Figure 4A:
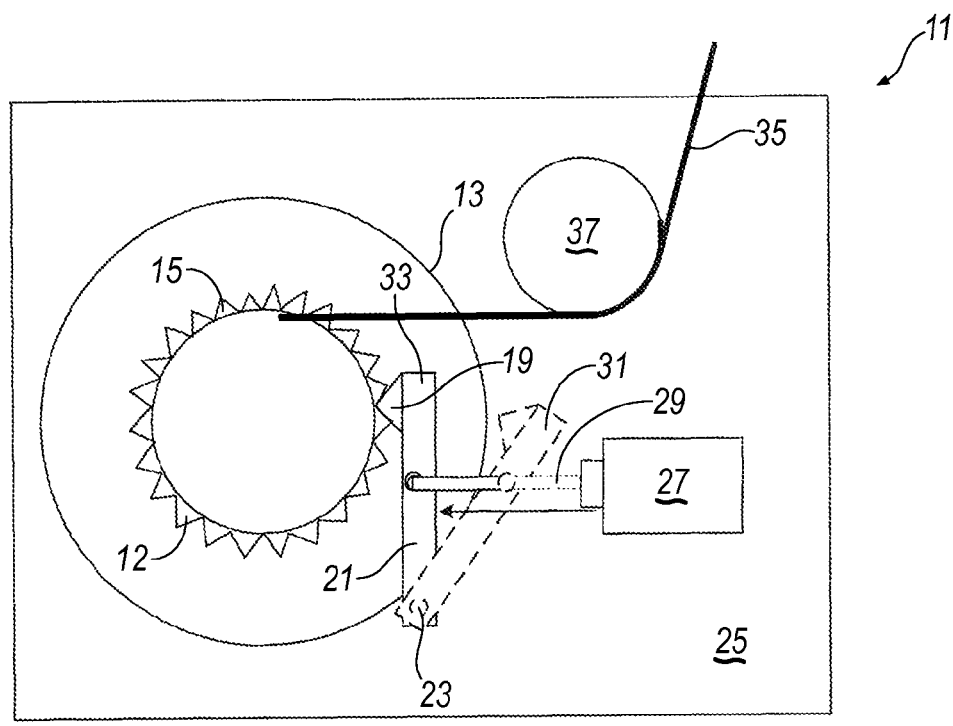
FIG. 4A is a schematic representation of a retractor lock mechanism according to one embodiment of the present application.

An alternate embodiment included within this application is to use electronically-activated retractor locks to restrict occupant movement during braking. As seen in FIG. 4A, there is illustrate a schematic representation of one electronically activated retractor lock mechanism 11 that could be used according to the present application. Specifically, belt retractor 13 has a retractor gear 15 with a plurality of sprocket teeth 12, that are adapted to engage tooth 19 on gear lock 21. Gear lock 21 has a pivot point 23 fixed to a housing 25 about which it pivots in response to force acted upon it by solenoid 27, that has an arm 29. In response to a signal from the controller, such as the ECU or, preferably the RCM, that a crash is imminent, the solenoid extends arm 29 to move the gear lock from an unengaged position 31 to an engaged position 33. That locks the retractor gear into place and prevents any rotation of seat belt webbing 35 about the feed pulley 37, thereby restricting the seat belt webbing payout. After the crash event has passed, the gear lock is moved away from engagement with the retractor gear and the seat belt webbing is free to be extended from the retractor and move about the feed pulley.

Figure 4B:
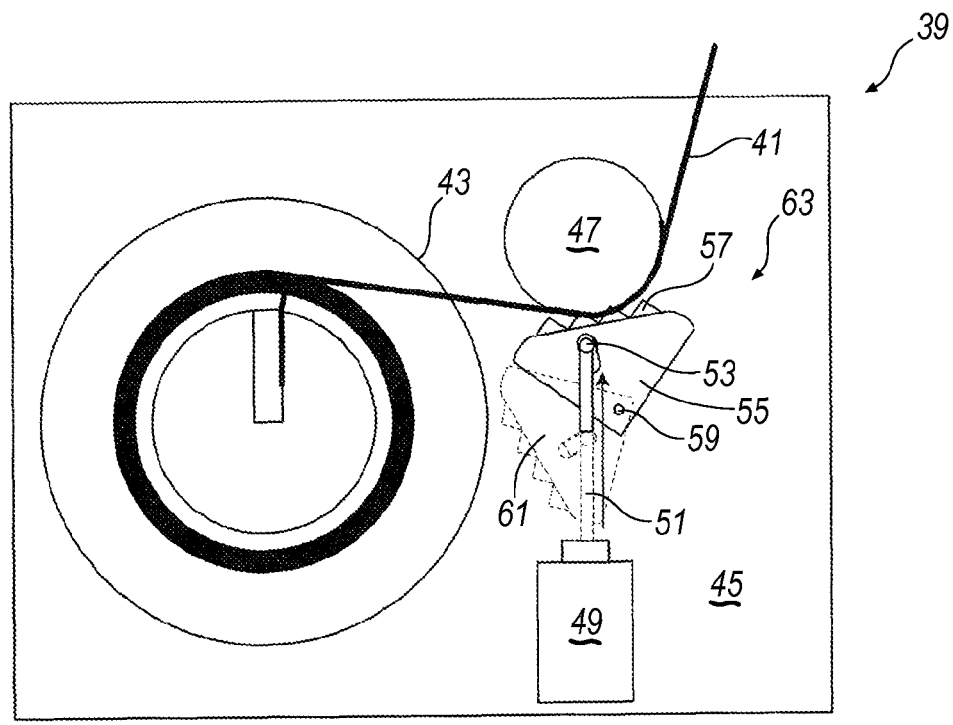
FIG. 4B is a schematic representation of a web grabber apparatus according to one embodiment of the present application.

In the embodiment of FIG. 4B, there is shown an embodiment of a web grabber. Specifically, seat belt web grabber 39 may be resiliently loaded so that the belt 41 may be wound about the belt retractor 43, and exited out of the retractor housing 45, around a feed pulley 47 and extending toward the passenger (not shown). A solenoid 49 is provided with a moveable arm 51 pivotally attached at pivot 53 to a web grabber 55. Web grabber 55 is equipped with engagement teeth 57, to assist in gripping the belt against the feed pulley to control the feed out of the belt from the retractor. In operation, the retractor starts in disengaged mode and the seat belt is free to feed out of the retractor. Upon receiving a signal from the controller, such as the ECU or more preferably the RCM, the solenoid activates, pushing the web grabber around its pivot point 59 from unengaged position 61 into an engaged position 63 and engaging the teeth with the seat belt webbing, thereby preventing the seat belt webbing from feeding or out of the retractor. Upon receiving a signal from the controller, such as the ECU or, preferably the RCM, the solenoid activates in the opposite direction pulling the teeth away from the belt and disengaging them, then rotating the web grabber back into the engaged position.

Some vehicles are equipped with inertially activated retractor locks which require a significant G-force at the retractor (approx. 0.4 G) to activate. This means that the retractors do not lock until some time after high-level braking is initiated or possibly not until after the crash pulse begins. When a retractor incorporates electronically-activated locks, the retractor could be locked at the moment of autonomous braking, resulting in significantly lower belt payout than the inertially activated retractor lock. The electronic retractor locks would be adequate at reducing pre-impact braking induced occupant displacement to the point where the occupant does not enter the airbag deployment zone, although they allow more belt payout than web grabbers. In any embodiment of this disclosure, the electronically controlled vehicle seat safety restraint system results in a pre-impact restraint system which improves upon the motorized belt pretensioners in cost and timing when used with pre-impact braking systems.

Figure 5:
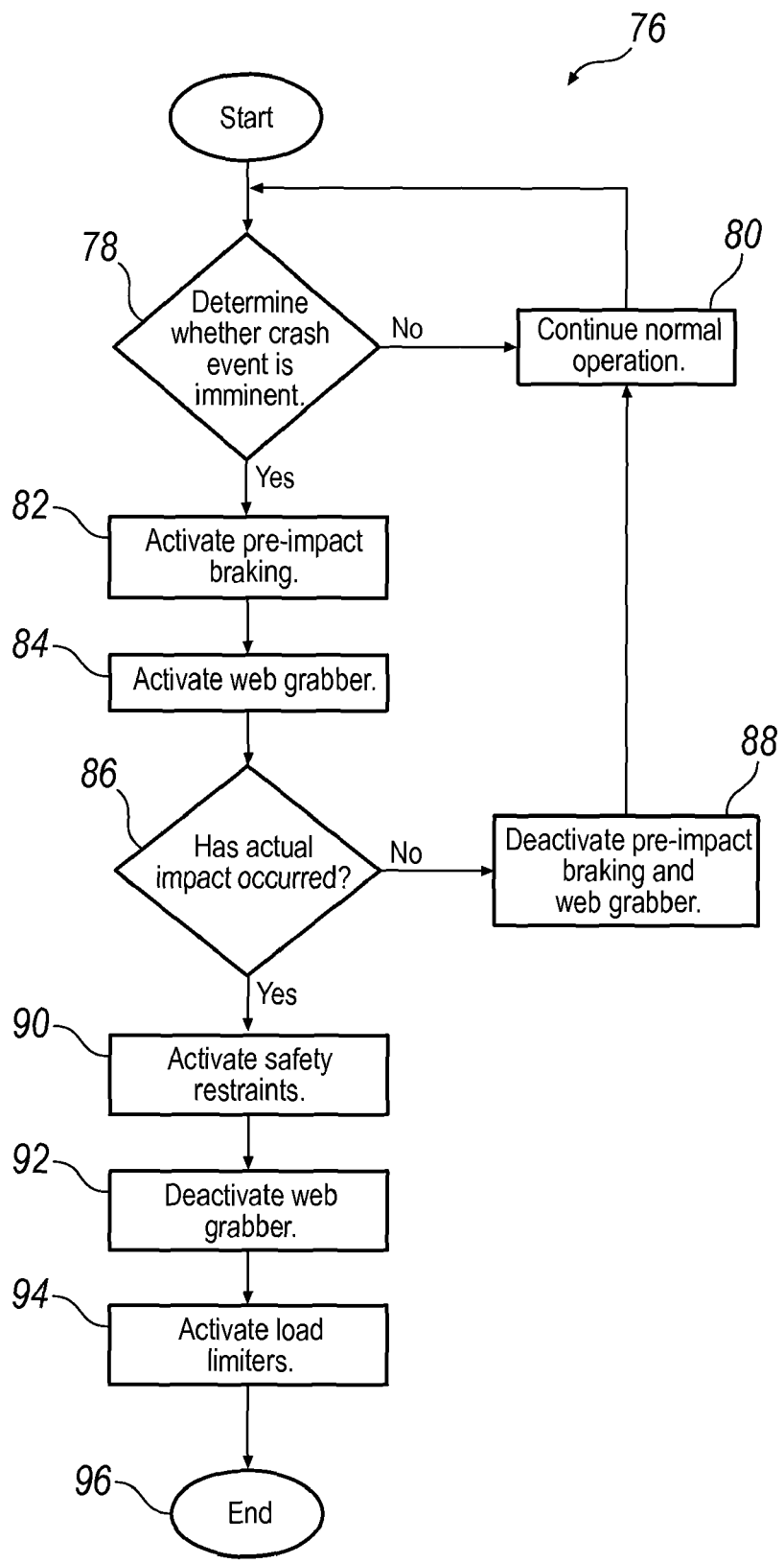
FIG. 5 is a schematic representation of one method according to one embodiment of the present application.

FIG. 5 is a schematic representation of one method 76 according to one embodiment of this application. Specifically, step 78 is determining whether a collision or impact is imminent. If no, the vehicle continues normal operation as at step 80. If it is determined that a crash is imminent, at step 82, pre-impact braking is initiated. Step 84 is activating the web grabbers. Step 86 is determining whether an actual impact event has occurred. If no, step 88 is deactivating pre-impact braking and web grabber. If it is determined that an actual impact has occurred, step 90 is activating vehicle safety restraints. Step 92 is deactivating the web grabber and, optional step 94 is to activate seat belt load limiters, which may or may not require electronic activation. The software ends at step 96.

The words used in this application are words of description, not words of limitation. Various modifications will be apparent to one skilled in the art without departing from the scope and spirit of the invention as set forth in the appended claims.

We claim:

1. A method to electronically operate a vehicle occupant restraint safety system in association with a vehicle seat, comprising:
   (a) determining, by means of at least one collision warning system, whether a vehicle collision event is imminent, and if so activating pre-impact braking and electronically activating via a solenoid in communication with a restraint control module a seatbelt web grabber having a clamping mechanism;
   (b) following activation of pre-impact braking and the seatbelt web grabber, determining whether an actual vehicle collision event has occurred, and if so activating a vehicle occupant restraint safety system and deactivating said seatbelt web grabber.

2. The method of claim 1, wherein said vehicle occupant restraint safety system is a safety restraint system comprising airbags and seatbelts.

3. The method of claim 1, further including, following determination that the actual vehicle collision event occurred, enabling seat belt load limiters in response to deactivating the seatbelt web.

4. The method of claim 1, wherein said clamping mechanism of the seatbelt grabber is spring loaded.

5. The method of claim 1, wherein at least one vehicle collision warning system comprises a Lidar, Radar, optical or ultrasonic sensor.

6. A system for electronically operating a vehicle occupant restraint safety system in association with a vehicle seat, comprising:
   (a) means for determining, by means of at least one collision warning system, whether a vehicle collision event is imminent, and if so means for activating pre-impact braking and means for electronically activating using a solenoid in communication with a restraint control module a seatbelt web grabber having a retractor lock mechanism;
   (b) following activation of pre-impact braking and the seatbelt web grabber, means for determining whether an actual vehicle collision event has occurred, and if so means for deactivating said seatbelt web grabber and means for activating a vehicle occupant restraint safety system.

7. The system of claim 6 wherein the seatbelt web grabber is spring loaded.

* * * * *